United States Patent [19]

Strawczynski et al.

[11] Patent Number: 5,229,995
[45] Date of Patent: Jul. 20, 1993

[54] RADIO LINK ARCHITECTURE FOR WIRELESS COMMUNICATION SYSTEMS

[75] Inventors: Leo Strawczynski; Howard M. Sandler, both of Ottawa; Gregory L. Plett, North Gower; David G. Steer, Nepean, all of Canada

[73] Assignee: Northern Telecom Limited, Montreal, Canada

[21] Appl. No.: 748,740

[22] Filed: Aug. 22, 1991

Related U.S. Application Data

[63] Continuation-in-part of Ser. No. 568,148, Aug. 16, 1990, abandoned.

[30] Foreign Application Priority Data

Jul. 17, 1990 [CA] Canada ................. 2021382

[51] Int. Cl.⁵ .................. H04J 3/16; H04B 1/00; H04B 7/00
[52] U.S. Cl. .................. 370/95.3; 370/95.1; 455/54.1
[58] Field of Search .......... 370/95.1, 95.3, 24, 370/61, 77, 76, 29; 379/59, 60, 61, 62; 455/33.1, 34.1, 34.2, 54.1, 56.1, 51.2, 55.1

[56] References Cited

U.S. PATENT DOCUMENTS

| | | | |
|---|---|---|---|
| 4,768,218 | 8/1988 | Yorita | 379/61 |
| 4,868,811 | 9/1989 | Suzuki | 370/50 |
| 5,020,051 | 5/1991 | Beesley et al. | 370/24 |
| 5,088,094 | 2/1992 | Grauel et al. | 370/95.1 |
| 5,124,985 | 6/1992 | Hoshikawa | 370/95.3 |
| 5,134,710 | 7/1992 | Akerberg | 370/95.3 |

Primary Examiner—Douglas W. Olms
Assistant Examiner—Ajit Patel
Attorney, Agent, or Firm—Jean-Pierre Fortin

[57] ABSTRACT

An improved radio link architecture for digital wireless communication systems which is characterized by the use of information and signalling channels on a number of RF carriers, thereby providing common signalling channels for call set-up and control functions. A first group of RF carriers are allocated as traffic channels between base stations and subscriber terminals. Each RF carrier in the first group comprises at least one traffic channel. A second group of RF carriers is allocated for providing common signalling channels between the base stations and the subscriber terminals. Each RF carrier having common signalling channels operates in time division multiple access mode, and each common signalling channel being time division duplexed.

8 Claims, 9 Drawing Sheets

RADIO LINK ARCHITECTURE FOR WIRELESS COMMUNICATION SYSTEMS

FIELD OF THE INVENTION

This is a continuation-in-part application of application having Ser. No. 568,148, filed 16 of Aug. 1990 now abandoned.

This invention relates to digital wireless communication systems, but more particularly to low-power wireless communication systems such as those using cellular channel re-use.

BACKGROUND OF THE INVENTION

Low-power wireless communication systems offer users the convenience of mobility and personal services, as well as significant cost savings in the installation and relocation of telecommunication equipment. Second generation cordless telephones using digital technology offer the promise of improved performance, communication of both voice and data services, a range of security options and enhanced convenience features when compared to their analogue predecessors. Such telephones can be used in the workplace, the residence and in public areas.

The concepts and designs of this system are guided by the following objectives:

comprehensive usage of a personal shirt-pocket or lightweight terminal across residential, office and public environments;

affordability, i.e. economical implementation down to residential and small business applications;

efficient spectrum utilization capable of supporting a complement of voice and data services at a quality comparable to wireline systems;

portability, i.e. amenable to miniaturization and low power consumption; and no compromise to network performance and integrity.

DESCRIPTION OF THE PRIOR ART

Present wireless systems do not meet all of these objectives. The radio link architecture defined by the UK CT2 standard for example, was conceived for residential services, and lacks the flexibility and capacity for intensive business applications. Also, it makes inefficient use of the available traffic channels. This is due to the use of traffic channels for communicating between the base stations and the portable handsets for radio link establishment before calls are established. Thus, traffic channels are unnecessarily tied up when a portable handset attempts to communicate with the base station in order to place a call or vice versa.

The radio link architecture of the DECT (Digital European Cordless Telecommunication) standard has been optimized for business applications at the expense of residential services. For example, it is optimized to support large traffic densities. In addition, it introduces excessive delay which requires echo control and may compromise network performance in some applications.

Some wireless or radio key telephone systems have been made available with a common signalling channel. For example, U.S. Pat. No. 4,768,218 which issued to Yorita describes a system wherein (N+1) radio channels provide N two-way communication channels between multiple radio transceivers in a base station and a number of handsets or subscriber terminals. A single signalling channel is used to communicate originating and terminating call requests between the base station and the handsets.

The problem associated with this system, is that it is designed for only a single base station. A single global common signalling channel is used for the entire system. This is unsuitable for a cellular radio environment, as the transmissions on the common signalling channel from multiple base stations would mutually interfere. This could result in unreliable signalling. Also, an entire radio channel is used for providing the signalling channel. Where frequency allocation is limited, this is an inefficient use of the frequency spectrum.

A communication system which can make use of more than one common signalling channel is described in U.S. Pat. No. 4,868,811 which issued to Suzuki. Suzuki discloses a multiple access communication system to perform communication between plural communicating units by selectively allocating plural carrier frequencies, which are different from the common signalling channel carrier frequency, to the plural communicating channels, and using a common signalling channel for establishing and releasing the communicating channels. The patent addresses the problem of communication between earth stations (communication units 3) via a satellite 1. A network control unit 2 is required to set up (set and release) a communication channel between the earth stations or communicating units 3.

Figure 2:
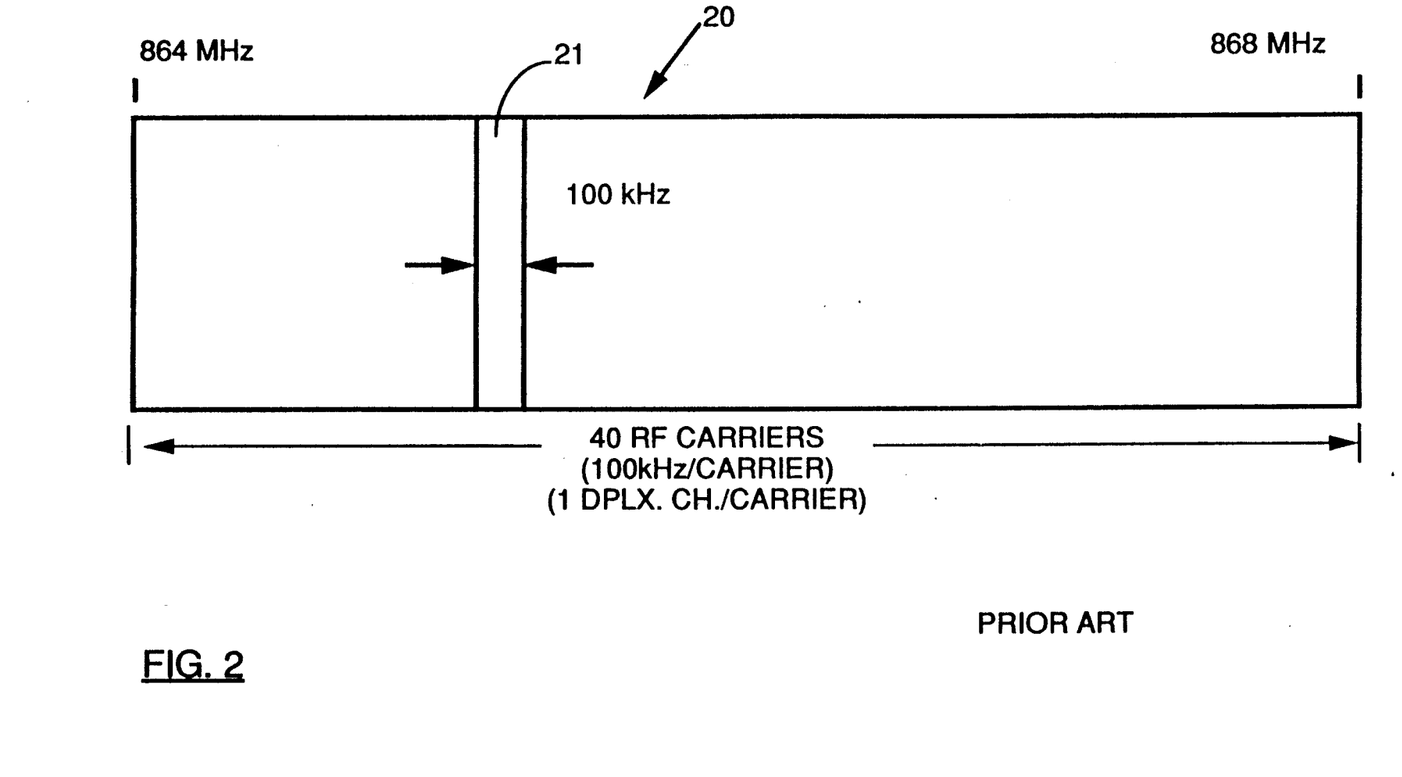
FIG. 2 is an illustration of the frequency plan for the CT2 standard.

The problem associated with this system, is that it requires that there be at least one time slot during which only the signalling channel is active in the system (see FIG. 2). During T1, there is no use of any of the traffic channels because the communication units cannot simultaneously transmit on more than one frequency. There is no signalling channel associated with each traffic channel, so communicating units must go back to the common signalling channel for such things as call tear-down, etc. Therefore, Suzuki is concerned with the use of time slots on a channel, such as, which time slot is used and when, so that the same time slot is not used on two frequencies at the same time. Also, in Suzuki, the satellite is just a radio repeater which amplifies the signal sent up from one communicating unit, shifts its frequency, and sends it down again to another communicating unit. That is, the radio link is really from communicating unit to communicating unit. The network controller is only used when the call is set up.

There is accordingly a need for an improved radio link architecture which eliminates the problems of existing systems while providing economical implementations in the workplace, the residence and in public areas.

Accordingly, it is an object of the present invention to provide an improved radio link architecture which can provide higher capacity and improved performance.

Another object of the present invention is to provide an improved radio link architecture which can provide value-added telephone services such as on-hook signalling, messaging, roaming, etc. without tying up traffic channels.

Another object of the present invention is to provide an improved radio link architecture which can provide a faster response time when setting up a call or checking for an incoming call.

Yet another object of the present invention is to provide an improved radio link architecture which can provide increased stand-by battery life to the portable handset.

SUMMARY OF THE INVENTION

The radio link architecture of the present invention is characterized by the use of separate traffic and signalling channels on a number of RF carriers, thereby providing common signalling channels for call set-up and control functions. Several common signalling channels when multiplexed together occupy the equivalent time/bandwidth of one traffic channel. This therefore is more efficient than each common signalling channel occupying the equivalent time/bandwidth of one traffic channel. Each traffic channel may contain a bearer channel for user voice and/or data and an associated signalling channel which is distinct from the common signalling channels.

According to an aspect of the present invention, there is provided an improved radio link architecture for use in a wireless communication system, the system having a number of base stations, each operating in separate cells and each communicating with a plurality of subscriber terminals over a plurality of RF carriers, comprising:

a first group of said plurality of RF carriers being allocated for use as traffic channels, each RF carrier in said first group being comprised of one full-duplex traffic channel, wherein one frame of time T on said channel is comprised of z full-duplex time slots, wherein each base station communicates simultaneously with a number of subscriber terminals located in its cell, over separate traffic channels; and a second group of said plurality of RF carriers being allocated for use as common signalling channels, each RF carrier in said second group being comprised of a number of full-duplex common signalling channels operating in time division multiple access mode, wherein a frame of time T on each of said carrier of said second group comprises n common signalling channels, each operating in a sub-frame, each sub-frame being comprised of z/n full-duplex time slots, wherein z is greater than or equal to n.

BRIEF DESCRIPTION OF THE DRAWINGS

FIG. 4b is an illustration of the common signalling channel format for the frequency plan described in FIG. 4a;

DESCRIPTION OF THE PREFERRED EMBODIMENT

Figure 1:
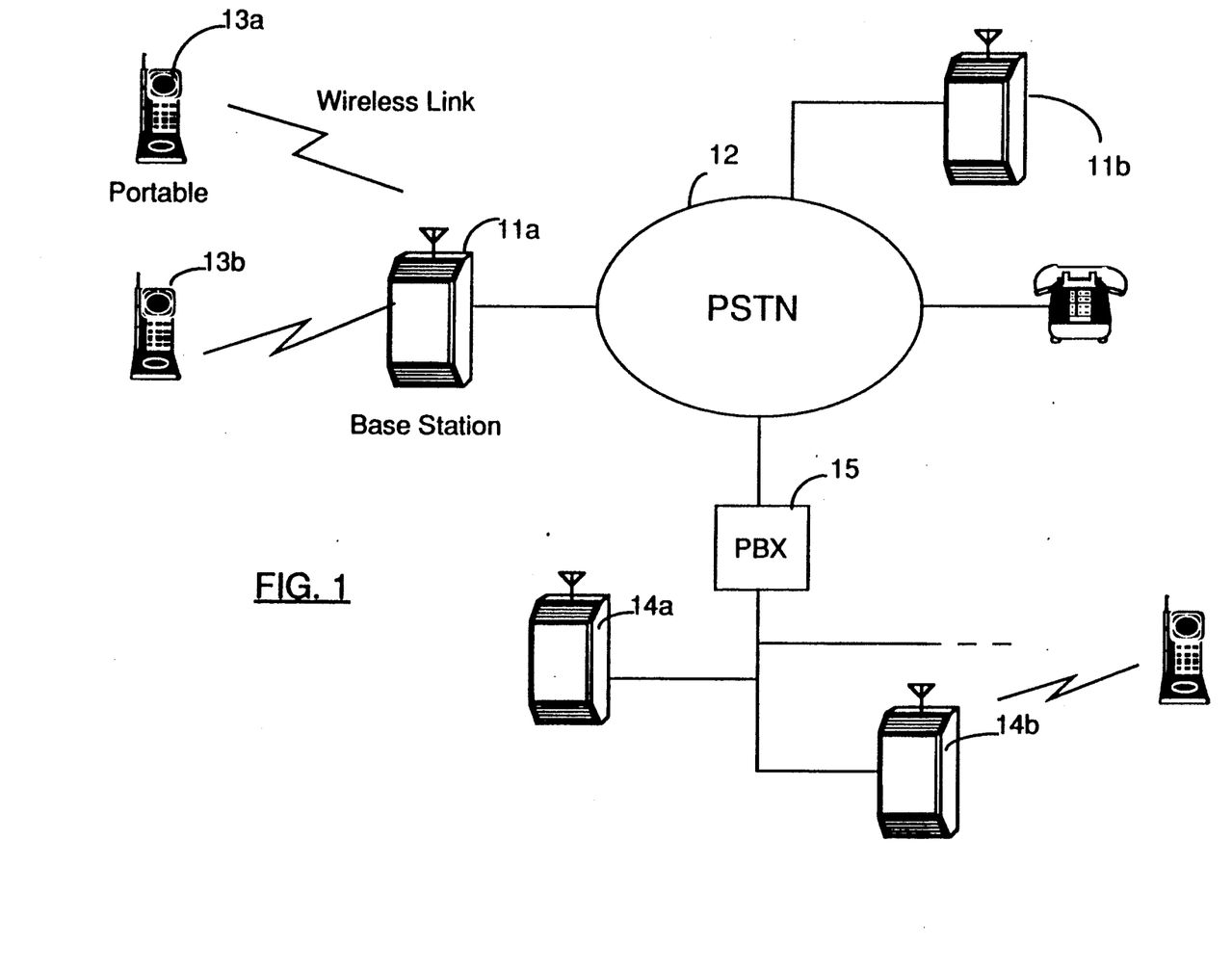
FIG. 1 is an illustration of a typical wireless type communication system.

In the illustration of FIG. 1, a wireless type communication system is shown. The concept of wireless or cordless telephones has evolved to provide users with a small, lightweight pocket handset with which calls can be made at home, at the workplace or near a public access point. For example, in the UK, the CT2 standard provides second generation cordless telephony. With CT2, digital transmission is used between the handset and the base station. This means that the speech has uniform clarity in its operational range. Small base stations 11a and 11b are comprised of radio transmitters and receivers. These are deployed in offices, residences and public areas, such as airports, gas stations and shopping malls. The base stations 11 are linked to the public switched telephone network (PSTN) 12 and form the interface with a number of subscriber terminals such as portable handsets 13a, 13b, etc. Several base stations, 14a, 14b, etc., can be linked to a host, such as a private branch exchange (PBX) 15 to provide coverage of larger areas in say, a private business or office building. Such a wireless system is disclosed in U.S. Pat. No. 4,771,448.

In FIG. 2, we have shown the radio link architecture for the current UK CT2 standard. This standard calls for operating spectrum of 864–868 MHz, i.e. a 4 MHz bandwidth as shown at reference numeral 20. Within this bandwidth, is provided 40 RF carriers. Each carrier 21 is used as one full-duplex channel with a bandwidth of 100 kHz per channel, i.e. in a Frequency Division Multiple Access (FDMA) mode, with time-division duplex operation. That is, one half-duplex time slot or burst in each frequency is used for communication from the base station to a portable handset and the adjacent half-duplex time slot or burst in the same frequency is used for communication between the portable handset and the base station. This technique is commonly referred to as "ping-pong". The bits sent in each burst are partitioned into B-channel bits, which convey user voice or data information, and D-channel bits which convey signalling information. The full-duplex D-channel on each traffic channel is referred to as the associated signalling channel. The associated signalling channels are distinct from the common signalling channels described herein.

Figure 3:
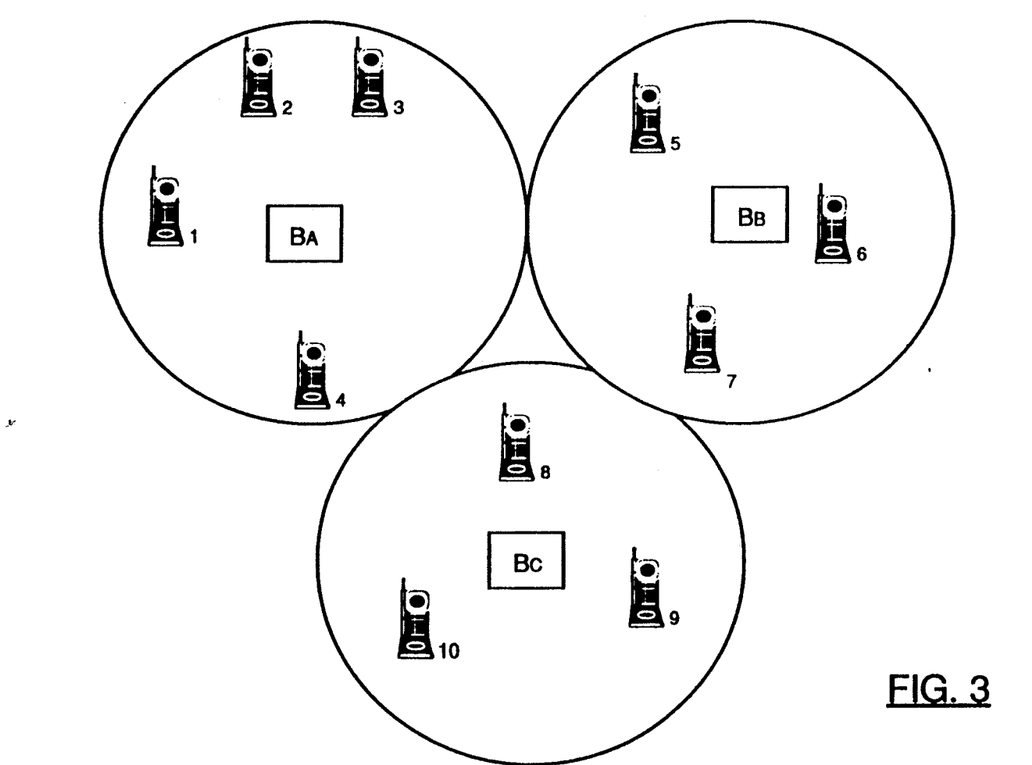
FIG. 3 is an illustration of a typical cell cluster environment for use by a CT2 wireless system.

In FIG. 3, we have shown an illustration of a typical cell cluster environment within which a CT2 wireless system may operate. The base stations $B_A$, $B_B$ and $B_C$ make use of dynamic channel allocation in a cellular type environment. That is, each base station can allocate any of the 40 channels, as long as a channel is not being simultaneously used by a nearby base station. By nearby, it is meant that the nearby base station is close enough that its emissions could be a significant source of interference.

Micro-cellular radio systems may use dynamic, rather than fixed, channel allocation. With dynamic channel allocation (DCA) each cell can potentially use any traffic channel of those allocated to the entire service for a given call. The decision as to which channel to use is made dynamically, i.e., based on channel usage conditions experienced at the time of call set-up. The decision may also be made in a decentralized manner, i.e., by the base station or subscriber terminal in question, without any centralized coordination with other cells. This has the advantages that the requirement for detailed engineering analyses for each cell site are minimized, cell sites can be easily added or moved, and more traffic can be handled than with fixed allocation because channels unused in neighbouring cells can be "borrowed".

In FIG. 3, handsets 1 to 4 would be served by base station $B_A$, whereas handsets 5 to 7 would be served by base station $B_B$ and handsets 8 and 9, by base station $B_C$.

Figure 4A:
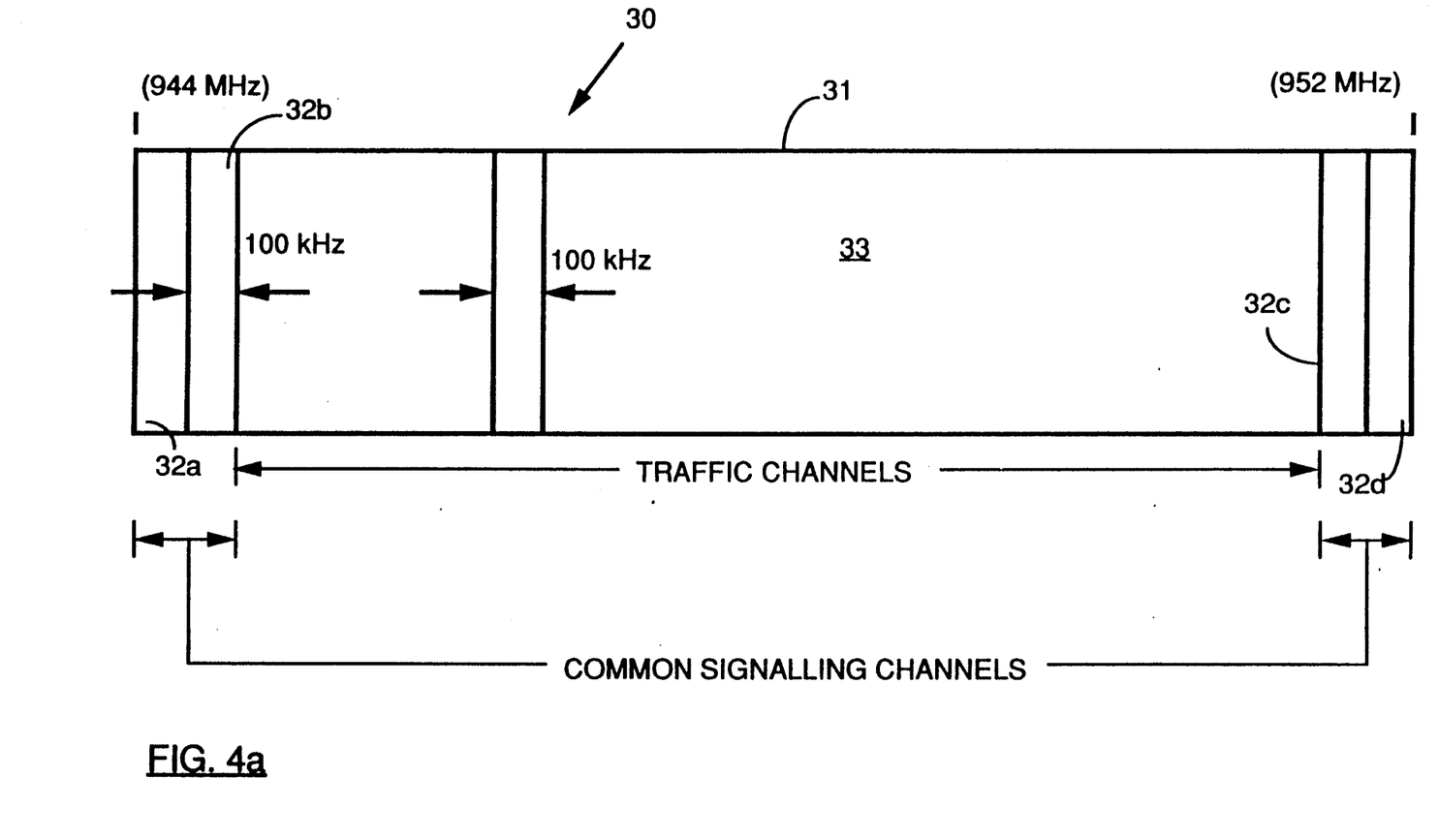
FIG. 4a is an illustration of the frequency plan for the improved radio link of the present invention.

FIG. 4a illustrates the improved radio link architecture of the present invention. As illustrated, the radio link consist of a number of RF carriers 30. As an example, assuming that the operating bandwidth 31 is 8 MHz. within the frequencies of 944 MHz and 952 MHz, 80 RF carriers of 100 kHz per carrier could be used.

However, in the embodiment of the present invention, a number of RF carriers 32a-d, are used or allocated for providing common signalling channels. In this example, four carriers 32a, 32b, 32c and 32d i.e. 5% of the bandwidth, are reserved for common signalling channels. Therefore, 76 RF carriers 33 are available as traffic channels for normal voice and data communication between handsets or subscriber terminals and a number of base stations. As shown, each traffic type RF carrier 33 and each RF carrier 32a-d used for common signalling channels would have a bandwidth of 100 kHz. Each RF carrier allocated to traffic channels comprises one full-duplex traffic channel, i.e. the traffic channels operate in FDMA mode. Each RF carrier allocated to common signalling channels, however, is comprised of several full-duplex common signalling channels. In this particular embodiment, the first two and the last two RF carriers are used to carry signalling channels. That is, channels 1, 2, 79 and 80. In other embodiments, the number of carriers allocated for providing common signalling channels and the location of these carriers within the spectrum could be different.

These common signalling channels in each reserved RF carrier are used for registration of portable handsets within a cell and call set-up to or from the base station with the strongest signal. Each base station broadcasts a unique signal on a common signalling channel. A portable handset scans the common signalling channels and registers with the base station which provides the strongest received signal. The registration is accomplished by signalling on that base station's common signalling channel. Registration facilitates location tracking of portable handsets. Both portable-originated and network-originated calls can therefore be set-up to the strongest base station, thereby enhancing performance and traffic capacity. Once registered, a portable handset need only monitor the common signalling channel of the base station that it has registered with for incoming calls, rather than having to scan all the traffic channels as in the UK CT2 system. This extends battery life, as the portable handset scan time is reduced, and the "sleep" cycle between scans can therefore be extended. Also, call set-up time is reduced.

An example of usage during call set-up is the identification and instruction as to what traffic channel is to be used for the call to proceed on. The common signalling channel can also be used for broadcast type services from the base stations. In addition, they can provide added features with fast response time, e.g. on-hook signalling.

The allocation of RF carriers dedicated for use as common signalling channels provides a more efficient use of the available spectrum without tying up valuable traffic channels, to establish an RF link.

It should be noted that the bulk of the call set-up messaging, e.g. authentication, can still be done on the associated signalling channel (i.e. D-channel) of each traffic channel, once a traffic channel has been selected and the base station and the handset have switched to that traffic channel.

Figure 4B:
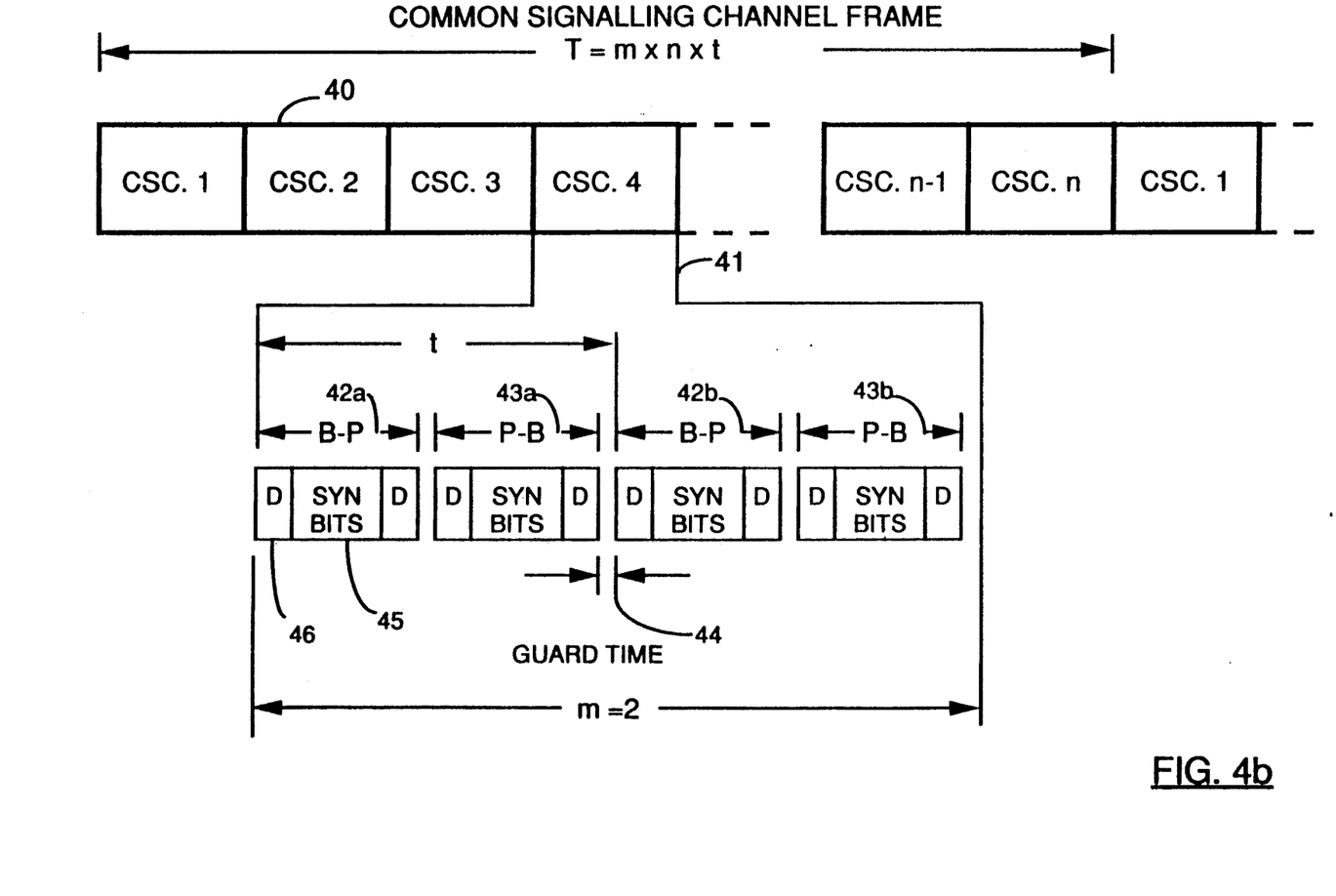

The illustration of FIG. 4b, shows the frame structure of a RF carrier allocated for use by common signalling channels, such as shown at reference numerals 32a-d of FIG. 4a. Basically, each RF carrier comprises a number of common signalling channels 40 operating in a Time Division Multiple Access (TDMA) mode. Whereas RF carriers allocated for use as traffic channels comprise one full-duplex traffic channel per time frame T, RF carriers allocated for use as common signalling channels, comprise several full-duplex common signalling channels for the same time frame T. Therefore, each of the four RF carriers shown in FIG. 4a is comprised of a number of common signalling channels, each common signalling channel operating within a sub-frame, adjacent to one another, such as shown in FIG. 4b. In this illustration, we have a common signalling channel frame of time T, where $T = m \times n \times t$, n is the number of common signalling channels and m is the number of full-duplex slots of time t within each common signalling channel. One frame is comprised of n sub-frames 41 or n common signalling channels CSCs. Each sub-frame is comprised of a number of full-duplex slots of time t. Each full-duplex slot has a first burst 42a for outbound transmission, i.e base to handset and a second burst 43a for inbound transmission, i.e. handset to base.

In FIG. 4b, the number of full-duplex slots within each channel is 2. That is, there are 2 bursts 42a and 42b allocated for outbound transmissions from the base to the portable handsets and 2 bursts 43a and 43b allocated for inbound transmissions from the portable handsets to the base. The total number of full-duplex time slots in the time frame T is z, where $z = T/t$.

In another embodiment, with $m = 1$, the first burst of the sub-frame of the channel would be used for outbound transmissions and the second burst would be used for inbound transmissions from the portable handsets.

The outbound transmissions may be used in a broadcast mode. That is, the information is directed to all portable handsets. The inbound channel is shared by all portables in the cell. The inbound channel can be a random-contention multiple access channel such as described in copending application entitled "Multiple access protocol" filed 18 Jun. 1990 and having Ser. No. 539,832.

Each burst is separated by a guard time 44. The burst contain synchronization data 45 and D-channel type signalling information 46. The synchronization data contain various words which indicate the status of the channel and are also used to gain bit and burst synchronization. The D-channel is used for signalling purposes including RF link establishment. The D-channel may also be used to indicate the status of the channel. At the end of time T, the frame pattern is repeated.

Figure 4C:
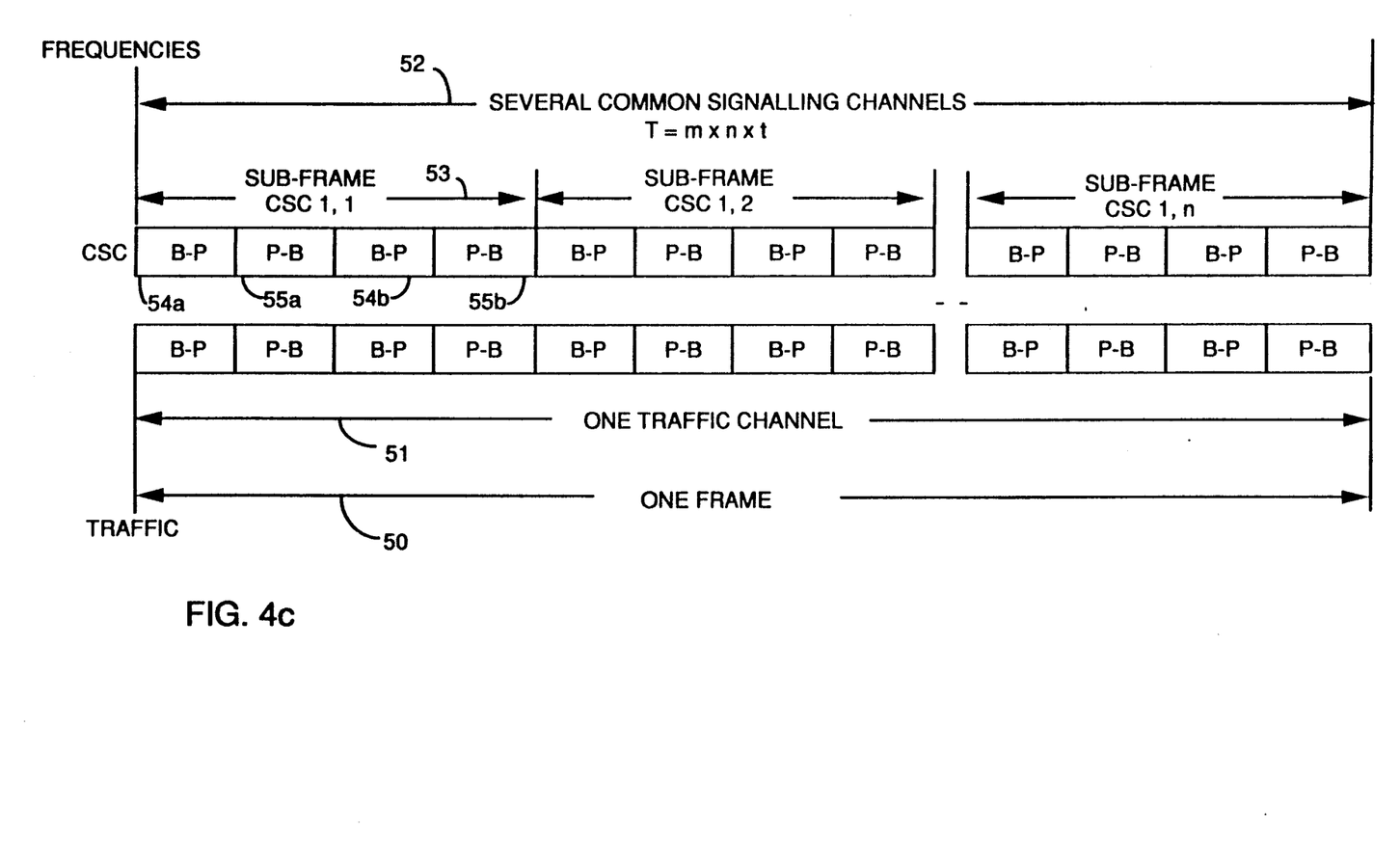
FIG. 4c illustrates the difference between the common signalling channel format for one time frame and a traffic channel format for the same time frame.

FIG. 4c illustrates the difference between the common signalling channel format for one time frame and a traffic channel format for the same time frame. As is shown, whereas one frame 50 on an RF carrier is used by one traffic channel 51, several common signalling channels 52 can fit on the same frame. Each common signalling channel takes-up a sub-frame 53 of time T/n, where n is the number of common signalling channels on each frame. Thus, several common signalling channels when multiplexed together occupy the equivalent time/bandwidth of one traffic channel.

As an example, if n=8, 8 common signalling channels are used within one reserved RF carrier. If there are 4 RF carriers dedicated for use by common signalling channels, then 32 common signalling channels would be available. As indicated above, the n signalling channels would be set-up in a Time Division Multiple Access (TDMA) mode, with time-division duplexing. Thus, each common signalling channel operates in a sub-frame 53, and each uses two bursts, for example, 54a and 54b of the sub-frame for outbound communication and the adjacent bursts 55a and 55b of the sub-frame for inbound communication. In the preferred embodiment, each of the RF carriers reserved for use as common signalling channels contain 8 TDMA sub-frames on a 32 ms. frame, i.e. T=32 ms., n=8, m=2, t=2 ms. and z=16. Thus, in this example, eight full-duplex common signalling channels occupy the equivalent time/bandwidth of one full-duplex traffic channel.

Figure 5:
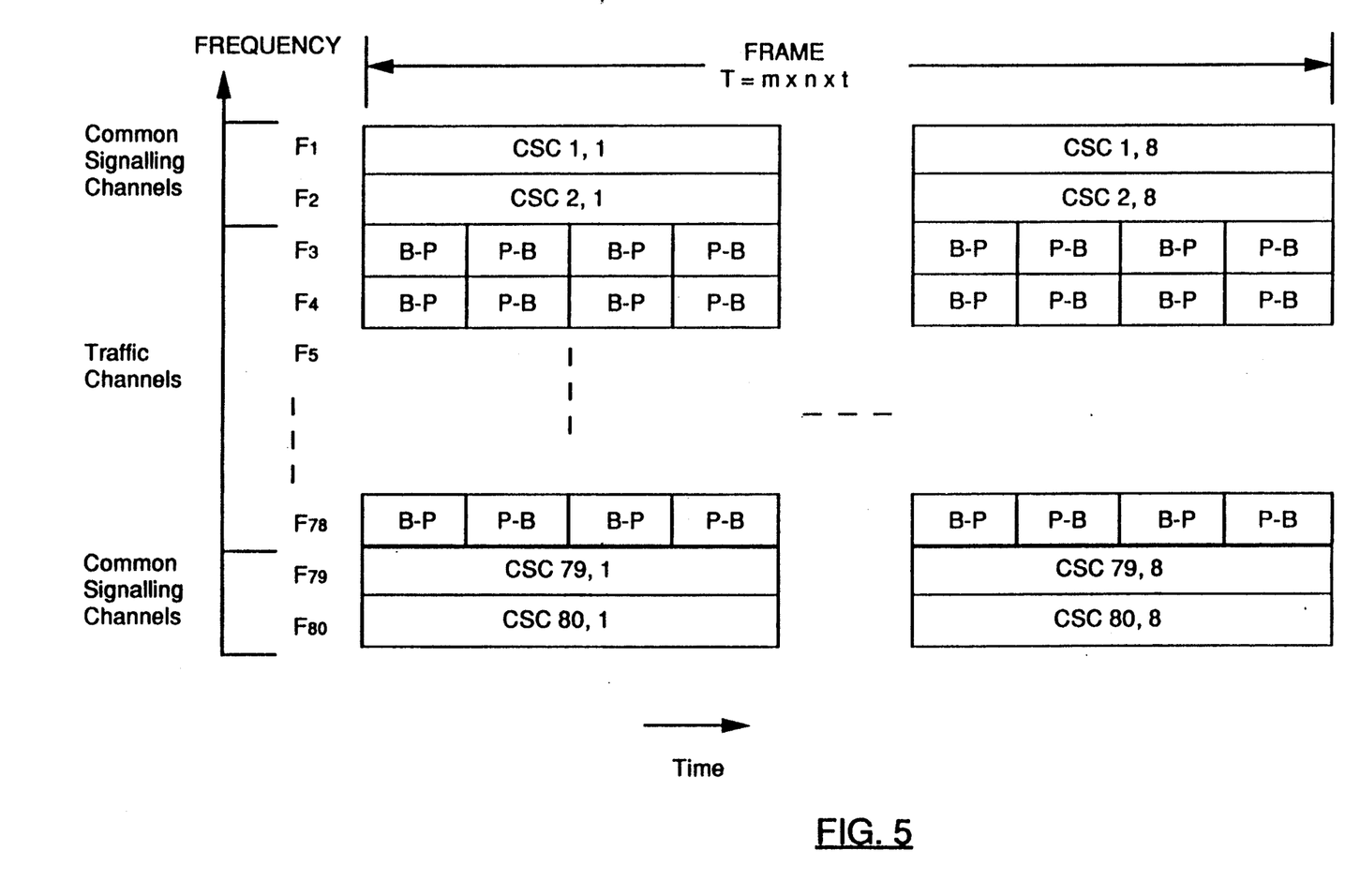
FIG. 5 is an illustration of a radio link architecture for the preferred embodiment of the invention.

FIG. 5 summarizes the architecture of the spectrum allocation for the preferred embodiment of the invention. In this embodiment, 4 RF carriers ($F_1$, $F_2$, $F_{79}$ and $F_{80}$) are allocated for use by common signalling channels and 76 RF carriers ($F_3$–$F_{78}$) allocated for use by traffic channels. The figure is set-up as a frequency versus time chart, wherein the y-axis depicts the allocation of the RF carriers along frequencies $F_1$ to $F_{80}$ and the x-axis depicts time for one frame T. Although the first and last two RF carriers have been allocated for use by common signalling channels, other assignments could also be used. For example, the first four RF carriers could be allocated for use by common signalling channels.

In general, the base stations can have either preassigned common signalling channels or obtain one or more from dynamic assignment, either in a decentralized manner or by a common controller of a group of base stations. In general, one common signalling channel per base station would be allocated. As an example of decentralized dynamic assignment, when a base station powers-up or resets, it will scan all common signalling channels and select a free channel upon which to operate. A free channel is sometimes defined as a channel where the level of received field strength is below a certain threshold. When a number of free channels exist, a number of selection strategies can be used to ensure random or uniform distribution of the common signalling channels in use. Those strategies are well know to those knowledgeable in this art and need not be discussed herein.

A common signalling channel may be used in a number of different modes, according to the requirements of the system. For example, it can be used in a broadcast mode to send information to all portable handsets within the listening range of the base station, in a paging mode to attempt call set-up with a specific handset or conversational mode for use as a communication link between a specific handset and the base station. Common signalling channels could be in different modes in adjacent cells at the same time.

Figure 6:
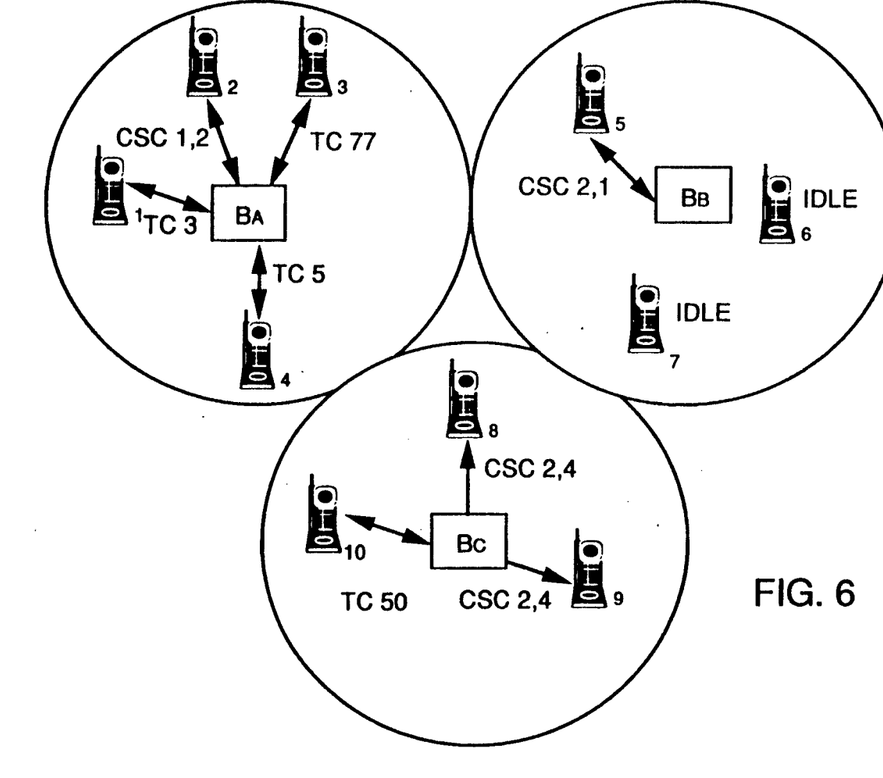
FIG. 6 illustrates a typical channel useage for the cell arrangement shown in FIG. 3.
Figure 7:
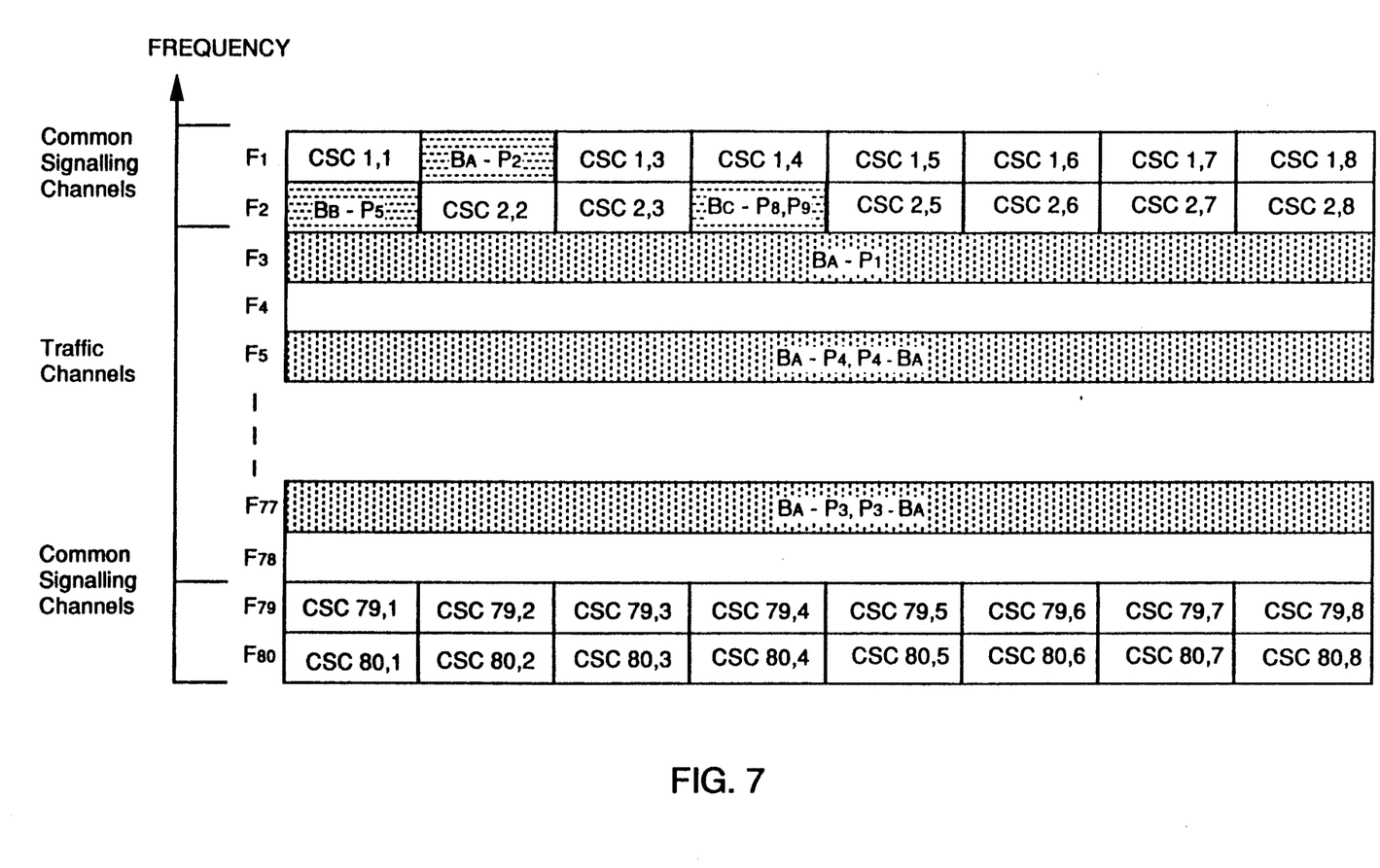
FIG. 7 illustrates the channel assignment for the scenario of FIG. 6.

In FIG. 6, we made use of the cell arrangement of FIG. 3, to illustrate that base stations $B_A$, $B_B$, and $B_C$ can communicate with portable handsets located nearby on any available common signalling channels. Base station $B_A$ operates on common signalling channel CSC 1,2, i.e. the signalling channel on RF carrier $F_1$, sub-frame 2, base station $B_B$ operates on common signalling channel CSC 2,1, i.e. the signalling channel on RF carrier $F_2$, sub-frame 1 and base station $B_C$ operates on common signalling channel CSC 2,4, i.e. the signalling channel on RF carrier $F_2$, sub-frame 4. As we can see, from FIG. 7, base stations $B_A$ and $B_B$ can both communicate on signalling channels on the same RF carrier ($F_2$), since each use a different time slot or sub-frame. Base station $B_A$ makes use of sub-frame 1, whereas base station $B_B$ makes use of sub-frame 4. Similarly, base station $B_A$ can simultaneously communicate to portable handset 1 on traffic channel TC 3, handset 3 on traffic channel TC 77 and handset 4 on traffic channel TC 5, since these traffic channels are on different RF carriers. At the same time, handset 2 is communicating with the base station on common signalling channel CSC 1,2. In this instance, handset 2 may be attempting a call set-up with base station $B_A$. At the same time, base station $B_B$ is communicating with handset 5 on CSC 2,1 while handsets 6 and 7 sit idle, i.e. they are not being used by their users. When a base station has information for all portable handsets in its cell, it will broadcast on its assigned common signalling channel information to all handsets. In FIG. 6, base station $B_C$ is broadcasting information to handsets 8 and 9 on its assigned common signalling channel, i.e. CSC 2,4 and handset 10 is simultaneously communicating with base station $B_C$ on TC 50. We can identify from FIG. 7 signalling and traffic channels that are not being used and can be assigned. For example, out of 32 possible common signalling channels, only 3 are being used. Similarly, out of 76 possible traffic channels (note TC 50 is not shown), only 4 are in use. It can be seen from this figure that a base station can simultaneously be communicating on one or more traffic channels and on a common signalling channel. As more handsets move into the operational range of the base stations, more traffic channels will be used. In practice, traffic and signalling channels would be assigned such that adjacent and co-channel interference is minimized. For example, handset 2 would likely be assigned to a traffic channel that is not adjacent to one already being used by the handset of a nearby user. As is evident from the above, a more efficient use of the entire frequency spectrum and time/bandwidth can be utilized, thereby extending the capacity and performance of the wireless system.

What is claimed is:

1. A method of operating a wireless communication system having at least two base stations, each operating in a separate cell and each communicating with a plurality of subscriber terminals over a plurality of RF carriers, comprising:

allocating a first group of said plurality of RF carriers for use as traffic channels between a base station and subscriber terminal, each RF carrier in said first group operating on a separate frequency, each RF carrier being comprised of one full-duplex traffic channel operating within a common time frame T comprised of z full-duplex time slots operating throughout the time frame T;

allocating a second group of said plurality of RF carriers for use as common signalling channels, each RF carrier in said second group being comprised of n full-duplex common signalling channels operating in time division multiple access mode within said common time frame T, each full-duplex common signalling channel operating in a sub-frame of time T/n, each sub-frame being comprised of z/n full-duplex time slots, wherein z, n and z/n are whole numbers with z greater than or equal to n;

assigning a first one of said common signalling channels to a first base station and a second one of said common signalling channels to a second base station such that subscriber terminals located in the cell of the first and second base stations can register and set-up calls using the first and second common signalling channels, respectively;

exchanging signalling signals between the first base station and subscriber terminals within the cell of the first base station via the first assigned one of the common signalling channels; and exchanging signalling signals between the second base station and subscriber terminals within the cell of the second base station via the second assigned one of the common signalling channels, such that registration and call set-up can be performed.

2. A method as defined in claim 1, wherein each full-duplex time slot used with said traffic channels of said first group and said common signalling channels of said second group is comprised of a first burst used for outbound transmission from said first and second base stations and a second burst used for in-bound transmission from each of said subscriber terminals located in the cell of the first and second base stations.

3. A method as defined in claim 2, wherein signalling signals between said first and second base stations and subscriber terminals located in the cell of the first and second base stations, are exchanged by:

broadcasting each of said first burst used as an outbound channel on said first and second assigned one of the common signalling channels from said first and second base stations, respectively to subscriber terminals located in the cell of first and second base stations, respectively; and receiving, at said first and second base stations, said second burst for each full-duplex time slot used as an in-bound channel by all subscriber terminals located in the cell of the first and second base stations, respectively.

4. A method as defined in claim 3, wherein a random contention multiple access protocol is utilized for each of said second burst on said in-bound channel of said first and second assigned one of the common signalling channels.

5. A method as defined in claim 4, wherein said protocol comprises slotted ALOHA with reservation format.

6. A method as defined in claim 2, wherein signalling signals between each of said first and second base stations and one subscriber terminal located in the cell of the first and second base stations, respectively, are exchanged by:

transmitting each of said first burst used as an outbound channel from each of said first and second base stations to said one subscriber terminal located in the cell of the first and second base stations on said first and second assigned one of the common signalling channels, respectively; and receiving, at said first and second base stations, said second burst used as an in-bound channel by said one subscriber terminal located in the cell of the first and second base stations, respectively.

7. A wireless communication system having a number of base station each operating in separate cells and each communicating with a plurality of subscriber terminals over a plurality of RF carriers, wherein a base station communicates with subscriber terminals located in its cell over a first group of RF carriers allocated for use as traffic channels, each RF carrier in said first group operating on a separate frequency, each carrier being comprised of one full-duplex traffic channel operating within a common time frame T comprised of z full-duplex time slots operating over the entire frame and the base station registers and sets-up calls with a subscriber terminal in its cell using a common signalling channel selected from a second group of said plurality of RF carriers allocated for use as common signalling channels, each RF carrier in said second group being comprised of n full-duplex common signalling channels operating in time division multiple access mode within said common time frame T, each full-duplex common signalling channel operating in a sub-frame of time $T/n$, each sub-frame being comprised of $z/n$ full-duplex time slots, wherein z, n and $z/n$ are whole numbers with z greater than or equal to n.

8. An improved wireless communication system having a number of base stations each being operable in a separate cell for communicating with a plurality of subscriber terminals over a plurality of RF carriers, wherein the improvement comprises:

each base station being operable with a first group of RF carriers allocated for use as traffic channels for communicating with subscriber terminals located in its cell, each RF carrier in said first group being of a separate frequency, each RF carrier being comprised of one full-duplex traffic channel operating within a common time frame T comprised of z full-duplex time slots operating over the entire frame; and each base station being operable with a common signalling channel selected from a second group of said plurality of RF carriers allocated for use as common signalling channels for registering and setting-up calls with a subscriber terminal in its cell, each RF carrier in said second group being comprised of n full-duplex common signalling channels operating in time division multiple access mode within said common time frame T, each full-duplex common signalling channels operating in a sub-frame of time $T/n$, each sub-frame being comprised of $z/n$ full-duplex time slots, wherein z, n and $z/n$ are whole numbers with z greater than or equal to n.

* * * * *